March 27, 1945.  W. T. GORTON  2,372,195
PRESSURE GAUGE
Filed June 29, 1943

Inventor
Walter T. Gorton
By C.E. Herrstrom & H.E. Thibodeau
Attorneys

Patented Mar. 27, 1945

2,372,195

UNITED STATES PATENT OFFICE 2,372,195

PRESSURE GAUGE

Walter T. Gorton, Springfield, Mass.

Application June 29, 1943, Serial No. 492,661

4 Claims. (Cl. 73—35)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a comparative pressure gauge particularly for determining relative pressures developed by firearm cartridges.

The conventional crusher type pressure gauge for determining the maximum pressures developed by firearm cartridges will accurately measure the maximum intensity of such pressure in pounds per square inch. For general usage however such accuracy is usually not necessary. Furthermore, the crusher type pressure gauge is a costly instrument and such cost is frequently prohibitive or unwarranted. Therefore, in most instances where occasional checks must be made on ammunition to determine whether the pressure developed by the ammunition is of correct order of magnitude a simple pressure gauge for comparative results would be very desirable.

Accordingly, it is an object of this invention to provide a comparative pressure gauge for indicating relative pressures developed by ammunition.

The specific nature of the invention as well as other objects and advantages thereof will clearly appear from a description of a preferred embodiment as shown in the accompanying drawing in which.

This invention, to be described in more detail later, utilizes the conventional "blowback" principle commonly employed in many automatic firearms. By utilizing this principle a comparative pressure gauge can be easily and economically constructed. Such a gauge comprises a receiver, a bolt member slidably mounted within the receiver, and a barrel. The pressure gauge is preferably mounted with the barrel in a vertical position.

Relative breech pressures developed by the cartridge are then readily determined by indicating and observing the height to which the bolt member recoils after the discharge of the cartridge. The gauge may first be calibrated if desired by using ammunition having a known pressure.

Figure 1:
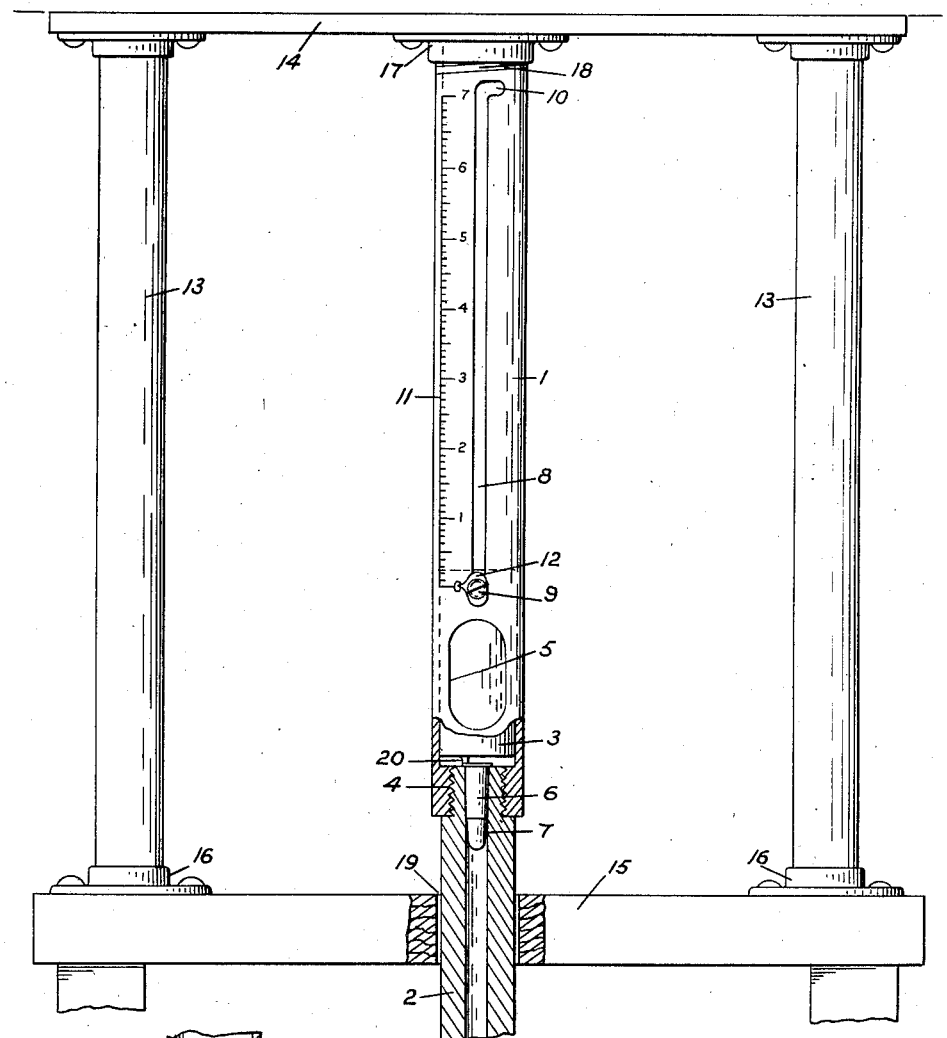
Fig. 1 is a front elevational view of the pressure gauge shown partly in longitudinal section.
Figure 2:
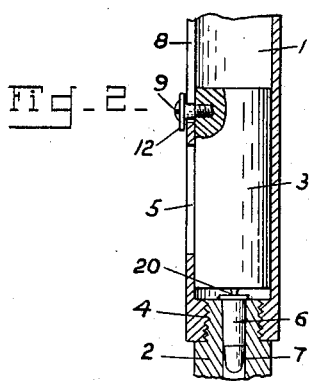
Fig. 2 is a partial longitudinal sectional view showing the bolt striking the primer of the cartridge.

The pressure gauge shown in assembled relation in Fig. 1 comprises mainly a receiver 1, a barrel 2 and an inertia member or bolt 3. The barrel 2 is secured to one end of receiver 1 as by the threads 4. The receiver 1 is preferably of tubular construction as shown in Fig. 1 and defines a vertical channel of sufficient length to accommodate the maximum recoil movement of bolt 3. A suitable slot 5 is provided in receiver 1 slightly above the end of barrel 2 to facilitate loading a cartridge 6 into the chamber 7 of barrel 2. A long longitudinal slot 8 is provided on receiver 1 to receive a bolt stud 9 as will be described. The bolt 3 is of cylindrical construction and is provided with an integral firing pin or striker 20 on the face thereof adjacent the end of barrel 2.

The bolt stud 9 is inserted through slot 8 in receiver 1 and is screwed into a suitably threaded hole in bolt 3. Stud 9 is provided for manually raising the bolt 3 within receiver 1. A suitable notch 10 is provided at the top of slot 8 to hold bolt 3 in a raised position while loading a cartridge into the chamber. To record the distance the bolt recoils after discharge of the cartridge a graduated scale 11 is provided on the surface of receiver 1 as shown in Fig. 1. An indicator 12 is secured to bolt stud 9 to facilitate reading the maximum recoil travel of the bolt 3.

The pressure gauge is preferably mounted in a vertical position as shown in Fig. 1. An inverted U-shaped stand may be utilized for such mounting which comprises two tubular uprights 13 joined at their upper ends by a crossarm 14. The crossarm 14 may be secured as by welding to each of the supports 13 and the supports 13 may be in turn secured to a suitable bench top 15 as by the flanges 16. A flange 17 secured as by welding to the underside of the arm 14 and in the center thereof is provided to receive the threaded end 18 of receiver 1. A suitable hole 19 is provided in bench 15 thru which barrel 2 may be inserted so that receiver 1 may be screwed into flange 17. It is readily apparent that the pressure gauge may be readily removed for cleaning purposes by merely unscrewing from flange 17.

It should be mentioned here that the cartridge in this particular application as shown in Fig. 1 is of the rim fire type and consequently the striker 20 is eccentric with respect to the longitudinal axis of bolt 3. For center fire cartridges striker 20 will of course be formed on the axis of bolt 3.

To insure uniform extraction of the cartridge case after discharge thereof, each case is first lubricated with a suitable light oil. To operate the pressure gauge the bolt 3 is raised to its uppermost position and bolt stud 9 rotated into engagement with notch 10. Thus bolt 3 will be held at the top of receiver 1. The lubricated cartridge 6 is then inserted in chamber 7, care being exercised to be sure that the cartridge is fully seated. Bolt stud 9 is then rotated slightly to the left as shown in Fig. 1 and released. The force of gravity will cause the bolt 3 to fall rapidly and striker 20 will hit the primer of the cartridge thereby effecting its discharge. The resulting gas pressure will "blowback" the cartridge 6 and hence drive the bolt 3 upwardly. The maximum rise of bolt 3 can then be readily determined by observing the position of indicator 12 on the graduated scale 11.

This pressure gauge may first be calibrated with standard cartridges of known pressure and the readings thus obtained may be used as a basis for determining whether cartridges of subsequent lots of cartridges conform to the standard pressure. Thus comparative pressure determinations may be conveniently made by the use of this pressure gauge.

While this type of pressure gauge is preferably used with cartridges developing comparatively low breech pressures it is obviously within the scope of this invention to adopt this device to cartridges developing comparatively high pressures such as developed by the U. S. Army caliber .30 cartridge. This may be readily accomplished by merely increasing the mass of the bolt and of course proportionately increasing the size of the other related components in order to accommodate the greatly increased pressure developed by such a high powered cartridge.

I claim:

1. A gauge for indicating pressure developed by a firearm cartridge comprising a vertically mounted barrel, said barrel being adapted to receive a cartridge, a receiver secured to the barrel, said receiver defining a vertical channel, an inertia member slidably mounted within said receiver channel and arranged to rest on the base of a cartridge inserted in said barrel, a firing pin associated with said inertia member and arranged to discharge the cartridge, and means for indicating the height reached by said inertia member after discharge of said cartridge, the mass of said inertia member being sufficient to limit its travel to less than the maximum permitted by the receiver.

2. A gauge for indicating pressure developed by a firearm cartridge comprising a vertically mounted barrel, said barrel being adapted to receive a cartridge, a tubular receiver secured to the barrel, an inertia member slidably mounted within said receiver and arranged to rest on the base of a cartridge inserted in said barrel, a firing pin projection on the bottom of said inertia member arranged to discharge the cartridge by dropping the inertia member on the cartridge, and means for indicating the height reached by said inertia member after discharge of said cartridge, the mass of said inertia member being sufficient to limit its travel to less than the maximum permitted by the receiver.

3. A gauge for indicating pressure developed by a firearm cartridge comprising a vertically mounted barrel, said barrel being adapted to receive a cartridge, a tubular receiver secured to the barrel, an inertia member slidably mounted within said receiver and arranged to rest on the base of a cartridge inserted in said barrel, means for latching said inertia member in said receiver in an elevated position with respect to the barrel, a firing pin projection on the base of said inertia member arranged to discharge the cartridge by the fall of said inertia member from its latched position, and means for indicating the height reached by said inertia member after discharge of said cartridge, the mass of said inertia member being sufficient to limit its travel to less than the maximum permitted by the receiver.

4. A gauge for indicating pressure developed by a firearm cartridge comprising a vertically mounted barrel, said barrel being adapted to receive a cartridge, a tubular receiver secured to the barrel, an inertia member slidably mounted within said receiver and arranged to rest on the base of a cartridge inserted in said barrel, a vertically extending slot in said receiver, a substantially horizontal slot in said receiver at the top of said vertical slot, a projection on said inertia member arranged to move in said slots whereby said inertia member may be latched in an elevated position with respect to said barrel by entry of said projection in said horizontal slot, a firing pin projection in the base of said inertia member arranged to discharge the cartridge by the fall of said inertia member from its latched position, a height scale on said receiver disposed along said vertical slot, and a pointer on said projection cooperating with said scale to indicate the height reached by said inertia member after discharge of said cartridge.

WALTER T. GORTON.